(12) United States Patent
Ridinger et al.

(10) Patent No.: US 10,632,505 B2
(45) Date of Patent: Apr. 28, 2020

(54) SYSTEM METHOD AND APPARATUS FOR HIGH PRESSURE LIQUID JET CLEANING OF SINTERED FILTERS

(71) Applicant: ASML Netherlands B.V., Veldhoven (NL)

(72) Inventors: Armin Bernhard Ridinger, San Diego, CA (US); Georgiy O. Vaschenko, San Diego, CA (US); Chirag Rajyaguru, San Diego, CA (US); Peter Michael Baumgart, Pleasanton, CA (US); Timothy Richard Palmer, San Diego, CA (US)

(73) Assignee: ASML NETHERLANDS B.V., Veldhoven (NL)

( * ) Notice: Subject to any disclaimer, the term of this patent is extended or adjusted under 35 U.S.C. 154(b) by 0 days.

(21) Appl. No.: 15/092,293

(22) Filed: Apr. 6, 2016

(65) Prior Publication Data
US 2017/0291196 A1 Oct. 12, 2017

(51) Int. Cl.
*B08B 3/02* (2006.01)

(52) U.S. Cl.
CPC .................................. *B08B 3/02* (2013.01)

(58) Field of Classification Search
None
See application file for complete search history.

(56) References Cited

U.S. PATENT DOCUMENTS

| | | | | |
|---|---|---|---|---|
| 3,650,283 A | * | 3/1972 | Lang | B01D 41/04 134/140 |
| 5,240,613 A | * | 8/1993 | Tsuchitani | B01D 41/04 210/636 |
| 5,263,504 A | * | 11/1993 | Bailey | B05B 3/02 134/172 |
| 5,487,836 A | * | 1/1996 | Mason | B01D 29/33 210/791 |
| 8,668,782 B2 | * | 3/2014 | Grieve | B01D 41/04 134/166 R |
| 2010/0237025 A1 | * | 9/2010 | Geibel | B01D 24/24 210/791 |
| 2011/0308543 A1 | * | 12/2011 | Uppili | B01D 41/04 134/1 |

* cited by examiner

*Primary Examiner* — Cristi J Tate-Sims
(74) *Attorney, Agent, or Firm* — Arent Fox LLP

(57) ABSTRACT

A system and method for cleaning a sintered filter includes a cleaning fluid source and a cleaning nozzle. The cleaning nozzle includes an inlet end coupled to the cleaning fluid source and at least one outlet port for outputting the cleaning fluid injected through the cleaning nozzle. The outlet port is disposed proximate to an outlet end of the cleaning nozzle. The cleaning nozzle has an external width less than an internal width of the sintered filter to be cleaned. The cleaning nozzle has a nozzle length greater than a full depth of the sintered filter to be cleaned. The outlet port can be disposed in a side of the cleaning nozzle proximate to the outlet end of the cleaning nozzle. The outlet port can include more than one outlet ports.

23 Claims, 16 Drawing Sheets

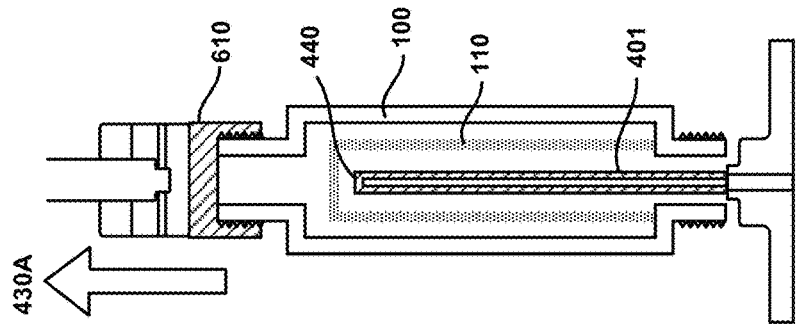
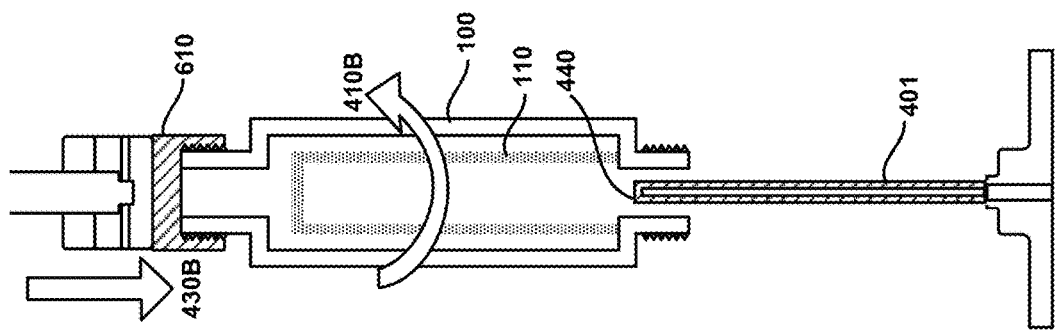
FIGURE 6C
FIGURE 6B
FIGURE 6A

SYSTEM METHOD AND APPARATUS FOR HIGH PRESSURE LIQUID JET CLEANING OF SINTERED FILTERS

FIELD OF THE DISCLOSURE

The present disclosure relates generally to filter cleaning, and more particularly, to methods and systems for cleaning sintered filters.

BACKGROUND

Sintered filters are used in many applications due to their superior filtering performance associated with their large surface area and non-linear pore paths. However, the sintered filters are often contaminated with a significant quantity of particles that are loosely attached to the surface or trapped in the sintered filter element. Most of the trapped and loosely attached particles are remnants of the sintering process that form the sintered filter element. The trapped and loosely attached particles can become loose and contaminate the fluid or gas being filtered by the sintered filter element. The trapped and loosely attached particles need to be removed with a cleaning process to ensure the trapped and loosely attached particles do not contaminate fluids passing through the sintered filter element.

Removing the trapped and loosely attached particles from the sintered filter element is difficult due to the porous nature and rough surface that makes the sintered filter element a desirable filter. It is in this context that the following embodiments arise.

SUMMARY

Broadly speaking, the present disclosure fills these needs by providing a system and method for cleaning sintered filters. It should be appreciated that the present disclosure can be implemented in numerous ways, including as a process, an apparatus, a system, computer readable media, or a device. Several inventive embodiments of the present disclosure are described below.

One embodiment provides a system for cleaning a sintered filter including a cleaning fluid source and a cleaning nozzle. The cleaning nozzle includes an inlet end coupled to the cleaning fluid source and at least one outlet port for outputting the cleaning fluid injected through the cleaning nozzle. The outlet ports are disposed proximate to an outlet end of the cleaning nozzle. The cleaning nozzle has an external width less than an internal width of the sintered filter to be cleaned. The cleaning nozzle has a nozzle length greater than a full depth of the sintered filter to be cleaned. The outlet port can be disposed in a side of the cleaning nozzle proximate to the outlet end of the cleaning nozzle. The at least one outlet port can include more than one outlet ports.

Another embodiment provides a method for cleaning the sintered filter including aligning the sintered filter and the cleaning nozzle such as along a common axis. A cleaning fluid is injected through the cleaning nozzle and output through an outlet port of the cleaning nozzle. The cleaning nozzle is inserted into the sintered filter at a selected insertion rate. The cleaning nozzle is prevented from contacting an inner surface of the sintered filter as the cleaning nozzle is inserted into the sintered filter. The cleaning nozzle is also withdrawn from the sintered filter.

The sintered filter and/or the cleaning nozzle can be rotated relative to each other as the cleaning nozzle is inserted into and/or from the sintered filter. The cleaning fluid can pass through the outlet port of the cleaning nozzle at a speed greater than about 250 meters per second, with the flow rate of greater than about 4 liters per minute and/or having a pressure of greater than about 400 bar. In one implementation the cleaning fluid is isopropyl alcohol or an isopropyl alcohol mix. The cleaning fluid can be a liquid or gas or combinations thereof. The flow of the cleaning fluid can be alternating with a gas so as to create a pulsed flow of the cleaning fluid.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The present disclosure will be readily understood by the following detailed description in conjunction with the accompanying drawings.

FIGS. 6A through 6D illustrates simplified schematic diagrams of the cleaning nozzle performing a cleaning operation on the sintered filter, for lamenting embodiments of the present disclosure.

DETAILED DESCRIPTION

Several exemplary embodiments for systems and methods for cleaning sintered filters will now be described. It will be apparent to those skilled in the art that the present disclosure may be practiced without some or all of the specific details set forth herein.

Figure 1:
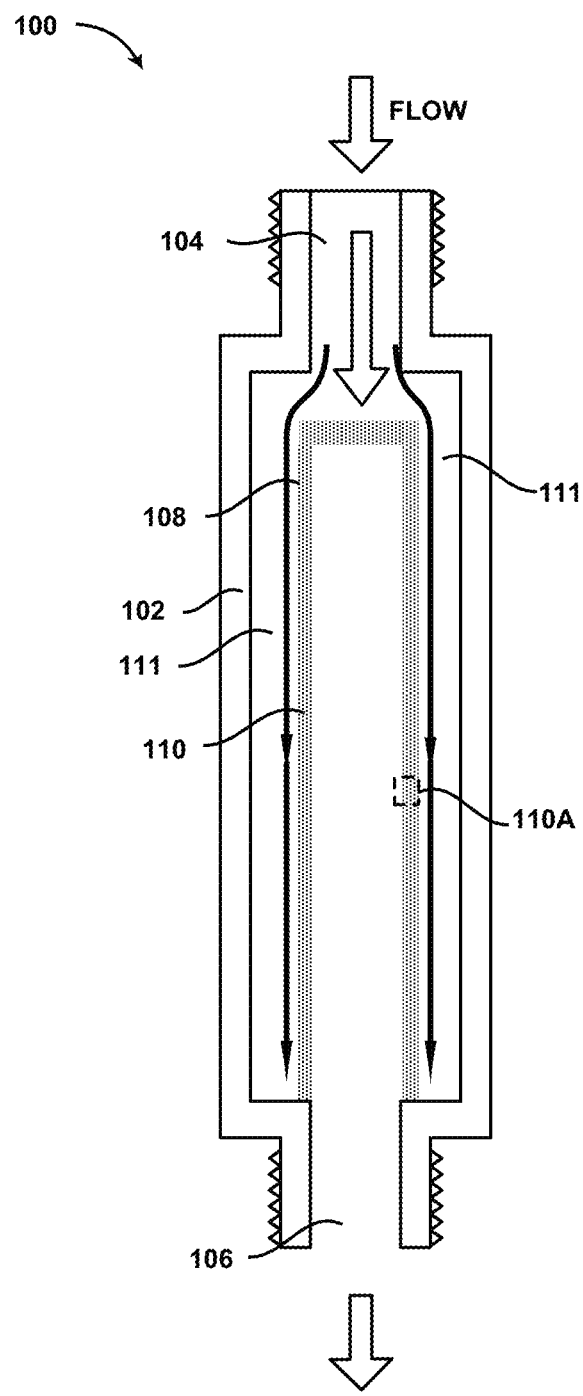
FIG. 1 is a cross-sectional view of an exemplary sintered filter, for implementing embodiments of the present disclosure.

Sintered filters are used in many applications due to their superior filtering performance as a result of their non-linear porous, large surface area structure. FIG. 1 is a cross-sectional view of an exemplary sintered filter 100, for implementing embodiments of the present disclosure. It should be understood that the sintered filter 100 is merely an exemplary structure and shape of a sintered filter and the cleaning systems and methods described herein can be applied to any shaped sintered filter.

The sintered filter 100 includes a filter housing 102, a filter inlet 104, a filter outlet 106 and a sintered filter element 110. In operation the fluid being filtered is input to the sintered filter 100 through the filter inlet 104. The fluid being filtered flows through the filter housing 102 through spaces 111 between the inner wall of the housing and the sintered filter element 110 so as to expose the fluid being filtered to the as much of the surface area of the sintered filter element as possible and to minimize any pressure drop across the filter. The pressure causing the fluid to flow through the sintered filter 100 pushes the fluid through the sintered filter element 110 toward the filter outlet 106 and out of the sintered filter.

The sintered filter element 110 is formed from many different metal particles that are sintered together in a sintering process. The sintered filter element 110 can be cleaned after the sintering process to remove most of the loose metal particles that were insufficiently secured to the sintered filter element by the sintering process. The sintered filter element 110 is then assembled into the filter housing 102 with the remaining components of the sintered filter 100. The assembly process of the sintered filter 100 can introduce additional loose particles into the sintered filter element 110 and can also loosen or weaken the bonding of some metal particles from the sintered filter element.

Figure 2:
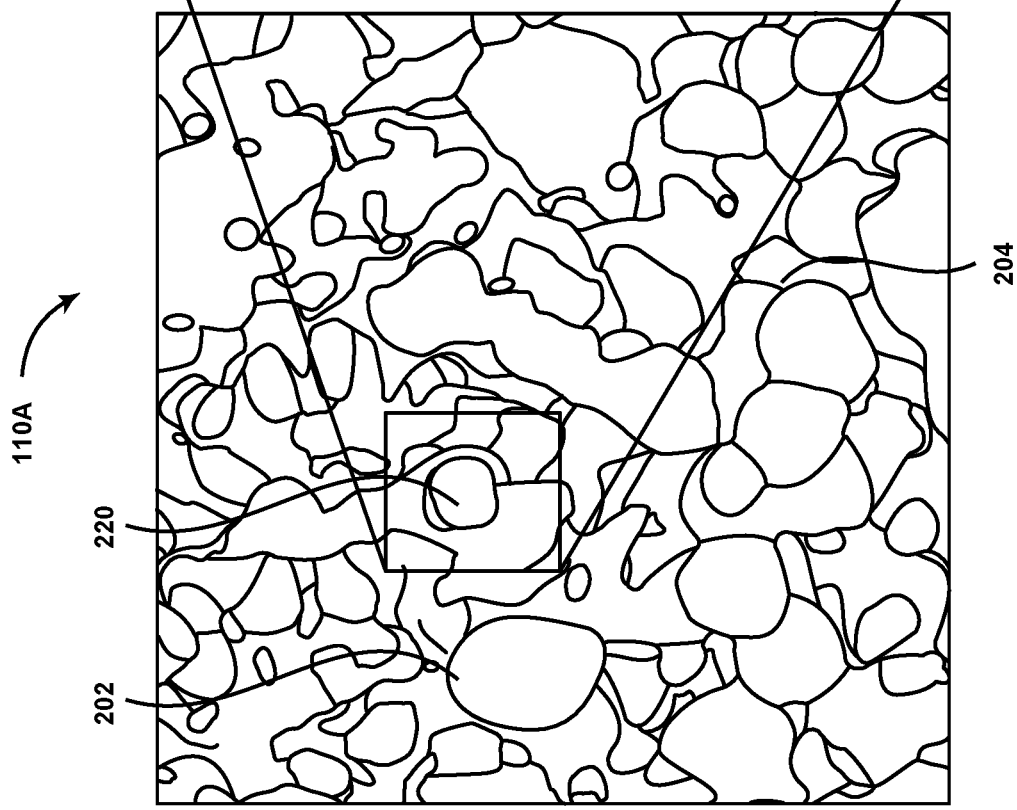
FIG. 2 is a scanning electron microscope (SEM) image of a portion of a sintered filter element, for implementing embodiments of the present disclosure.

FIG. 2 is a scanning electron microscope (SEM) image of a portion 110A of a sintered filter element 110, for implementing embodiments of the present disclosure. The image of the portion 110A shows the extensively porous surface area of the sintered filter element 110 due to the sintering of the many different metal particles 202 that are bound together to form the sintered filter element. The voids 204, e.g., the dark areas shown, in the sintered filter element 110 are the areas where the fluid to be filtered pass through the sintered filter element.

Figure 3:
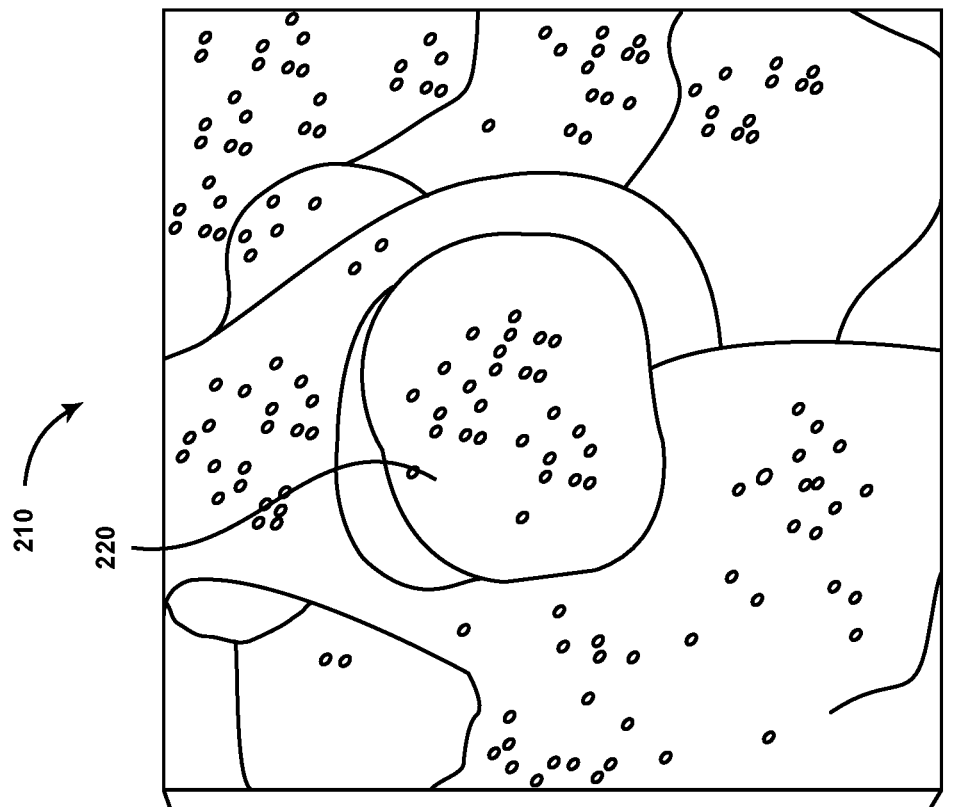
FIG. 3 is a more detailed scanning electron microscope (SEM) image of an even smaller portion of the sintered filter element, for implementing embodiments of the present disclosure.

FIG. 3 is a more detailed scanning electron microscope (SEM) image of an even smaller portion 210 of the sintered filter element 110, for implementing embodiments of the present disclosure. The more detailed SEM image of the smaller portion 210 shows a loose or loosely attached particle 220 on the surface of the sintered filter element 110 that can become dislodged and contaminate a fluid flowing through the sintered filter element.

Cleaning the sintered filter element 110 is a challenge due to the non-linear porous, large surface area characteristics of the sintered filter element, which may protect contaminants. Physically wiping or scrubbing the surface of the sintered filter element 110 may dislodge and remove loose particles directly on the surface however, wiping or scrubbing the surface will not dislodge loose or loosely attached particles more deeply placed within the porous structure of the sintered filter element. Further, physically wiping or scrubbing the surface of the sintered filter element 110 can also introduce additional contaminants into the sintered filter element. The additional contaminants can be introduced from the media e.g., cloth, brush, etc., from the tool used to wipe or scrub the surface of the sintered filter element.

Figure 4:
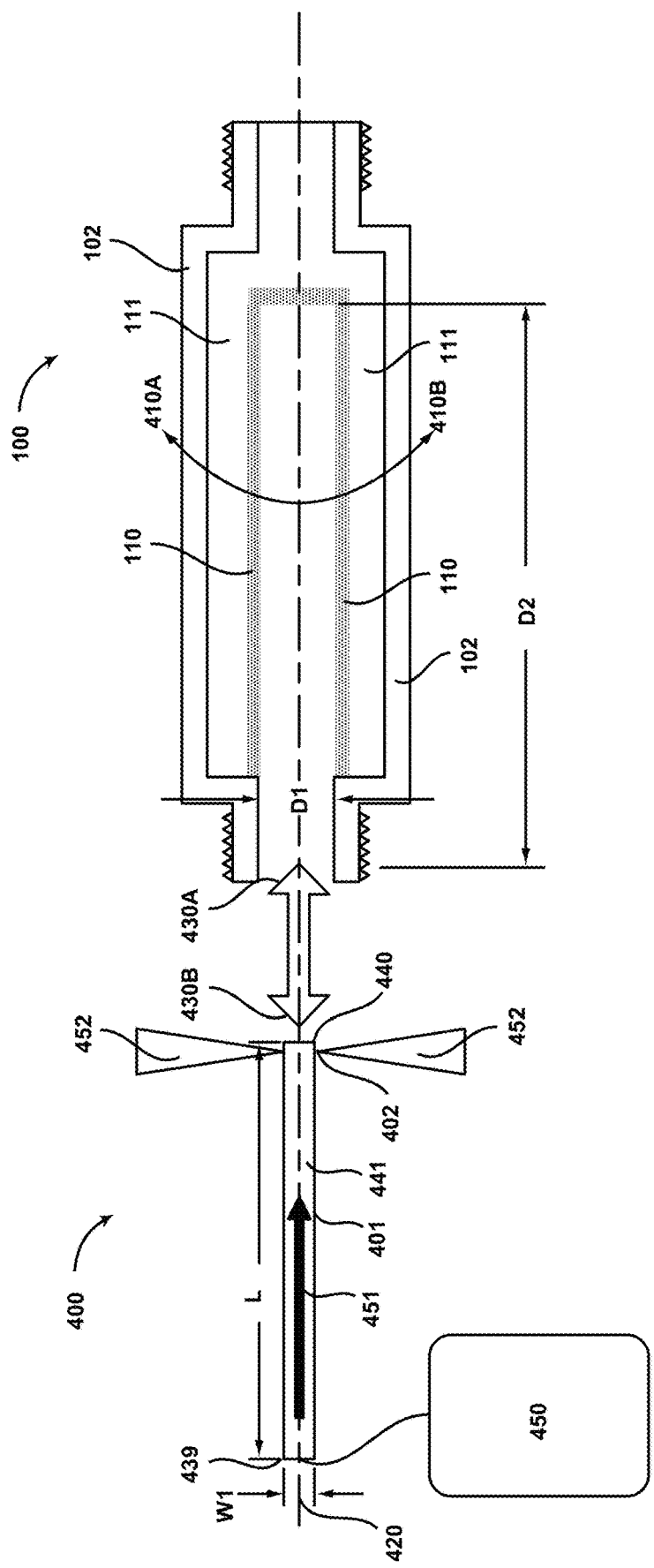
FIG. 4 is a simplified schematic diagram of a sintered filter cleaning system for the exemplary sintered filter, for implementing embodiments of the present disclosure.

FIG. 4 is a simplified schematic diagram of a sintered filter cleaning system 400 for the exemplary sintered filter 100, for implementing embodiments of the present disclosure. The cleaning system 400 includes a cleaning fluid supply 450 coupled to an inlet end 439 of a cleaning nozzle 401. The cleaning nozzle 401 includes at least one outlet port(s) 402 in or near an outlet end 440 of the cleaning nozzle. The cleaning nozzle 401 also includes a hollow inner portion 441 coupling the inlet end 439 to the outlet end 440. The cleaning fluid supply 450 can include a pressure control and flow rate control to vary the pressure and flow rate as may be needed to effectively clean the sintered filter to be cleaned. The cleaning fluid supply 450 can also include one or more filters to filter the cleaning fluid to prevent the cleaning fluid from being a particle source that could contaminate the sintered filter to be cleaned. In one implementation, cleaning fluid supply 450 includes a filter with a less than 5 micron pore size. Other smaller or larger pore size filters could be included in the cleaning fluid supply 450.

The cleaning nozzle 401 is sized to fit within the sintered filter 100 in that the cleaning nozzle has an external width W1 less than an inner diameter D1 of the sintered filter 100. Further the cleaning nozzle 401 has a nozzle length L equal to or greater than and sufficient to reach the full depth D2 of the sintered filter 100. The cleaning fluid supply 450 supplies cleaning fluid 451 to the inlet end 439 of the cleaning nozzle 401. The cleaning fluid 451 flows through the inner portion of the cleaning nozzle. In the illustrated implementation, the cleaning nozzle 401 includes at least two outlet ports 402, however only one outlet port could be used in other implementations. The cleaning fluid is emitted at a jet velocity out of the inner portion of the cleaning nozzle, through the at least two outlet ports 402. The at least two outlet ports are shaped to emit the cleaning fluid in a fan shape spray 452, at high pressure and onto the surface of the sintered filter element 110. The sintered filter 100 and/or the cleaning nozzle 401 can be rotated in directions 410A, 410B, relative to each other as the cleaning nozzle is inserted into and/or withdrawn from the sintered filter.

The cleaning nozzle 401 can be manufactured in any suitable manner from any suitable materials. A suitable material is capable of providing the necessary structural strength to resist the operational pressures as disclosed elsewhere herein and also resist erosion at the flow rates disclosed elsewhere herein. A suitable material is also chemically compatible with the cleaning fluid being used. A suitable material also will not become a source of particles and other contaminants that could contaminate the sintered filter. In one implementation the cleaning nozzle 401 is manufactured from a metal or combination of metals and metal alloys. In one implementation the cleaning nozzle 401 is manufactured from a stainless steel alloy as stainless steel with sufficient wall thickness can provide the necessary structural strength to resist the operational pressures and erosion and is compatible with the isopropyl alcohol containing cleaning fluid used in this particular application. In other applications, other metals and alloys thereof may be better suited and can be used to form the cleaning nozzle 401. In yet other applications a polymer such as a polytetrafluoroethylene (PTFE) or similar polymer could be used to form the cleaning nozzle 401. In yet another implementation, the cleaning nozzle 401 can be formed from a ceramic. It should also be understood to cleaning nozzle 401 can be manufactured in any suitable manner such as machining from solid material, stamping from sheet or solid material, molding from a liquid using one or more molds, direct metal laser sintering (DMLS) and/or a 3-D printing process using any suitable material, and combinations thereof.

Figure 5:
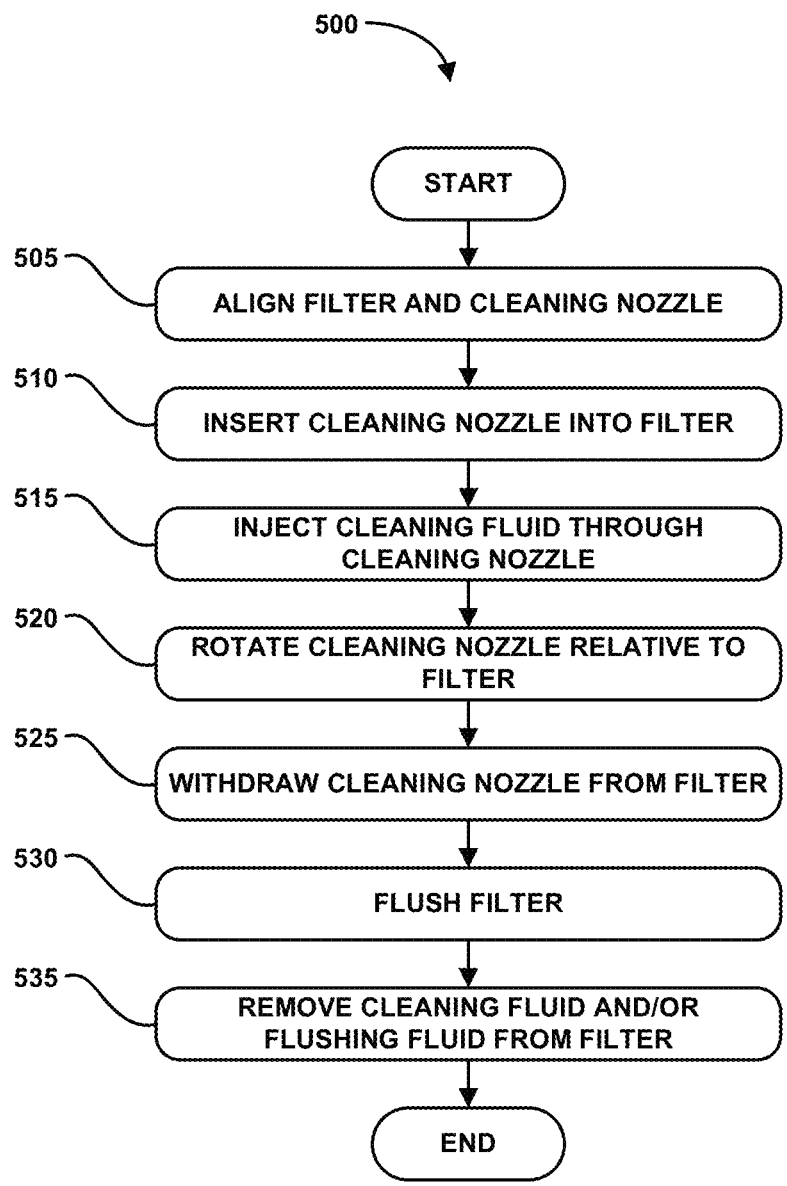
FIG. 5 is a flowchart diagram that illustrates the method operations for cleaning the sintered filter using the simplified cleaning nozzle, for implementing embodiments the present disclosure.

FIG. 5 is a flowchart diagram that illustrates the method operations 500 for cleaning the sintered filter 100 using the simplified cleaning nozzle 401, for implementing embodiments of the present disclosure. The operations illustrated herein are by way of example, as it should be understood that some operations may have sub-operations and in other instances, certain operations described herein may not be included in the illustrated operations. With this in mind, the method and operations 500 will now be described.

In an operation 505, the sintered filter 100 is aligned with the cleaning nozzle 401. The alignment of the sintered filter 100 and the cleaning nozzle 401 is important so that the surfaces of the cleaning nozzle do not impinge on the surfaces of the sintered filter element 110 so as to possibly dislodge particles from or otherwise damage the surface of the sintered filter element. Contact between the cleaning nozzle 401 and the inner surface of the sintered filter element can also result in contamination of the sintered filter element by material from the cleaning nozzle. The sintered filter 100 can be aligned with the cleaning nozzle 401 along a longitudinal axis 420 of the sintered filter. The cleaning nozzle is inserted into the sintered filter 100, in a direction 430A, in an operation 510. In one implementation, the cleaning nozzle is inserted into the sintered filter at an insertion rate of between about 1.0 mm/s and about 5.0 mm/s. In one implementation, the insertion rate is about 2.5 mm/s.

In an operation 515, a cleaning fluid is injected through the cleaning nozzle 401 and out the two or more outlet ports 402. In one exemplary implementation, the cleaning fluid is injected through the cleaning nozzle 401 at a flow rate of about 4 liters per minute and a pressure of greater than about 400 bar.

In one implementation cleaning fluid supply 450 includes an air driven, cleaning fluid compatible, oil free piston pump. In another implementation the cleaning fluid supply 450 includes a high pressure gas source such as a high pressure bottle of a carrier gas such as nitrogen or argon or dry air to provide the pressure required for the cleaning fluid.

In one implementation, the cleaning fluid emerges from the outlet port 402 of the cleaning nozzle 401 at a jet velocity of between about 250 m/s and about 350 m/s. It should be understood that the jet velocity required for a given sintered filter element corresponds to the durability of the sintered filter element such that the suitable jet velocity for the sintered filter element may be higher or lower depending upon the ability of the sintered filter element to withstand the jet velocity of the cleaning fluid. In one implementation, a first, sintered filter element maybe capable of withstanding a jet velocity of 400 m/s before the cleaning fluid would damage the first, sintered filter element. In another implementation for cleaning a second, sintered filter element capable of only withstanding a jet velocity of about 150 m/s before being damaged by the cleaning fluid than the maximum jet velocity would be less than about 150 m/s for the second, sintered filter element.

In one implementation, at least a portion of the cleaning fluid includes an isopropyl alcohol. However it should be understood that other cleaning fluids could also be used. By way of example, other types of alcohols other than isopropyl alcohol, solvents such as acetone or similar solvents, a gas such as argon or nitrogen and mixtures thereof. In one implementation the cleaning fluid has a temperature less than about 50 degrees C. when contacting the sintered filter element so as to reduce the likelihood of oxidation of the sintered filter element. It should be understood that in other implementations cleaning other types of sintered filter elements the temperature of the cleaning fluid can be greater than about 50 degrees C. Example cleaning fluids include isopropyl alcohol cleaning solutions such as isopropanol, 2-propanol, Dimethyl carbinol, sec-propyl alcohol in a 98-100 percent concentration.

In an optional operation 520, at least one of the sintered filter or the cleaning nozzle or both are rotated so that the outlet port of the cleaning nozzle sweeps past the entire inner surface of the sintered filter element 110. In one implementation, the sintered filter 100 and/or the cleaning nozzle 401 are rotated in directions 410A and/or 410B, at a rate of about 450 revolutions per minute, relative to each other. The sintered filter 100 and/or the cleaning nozzle 401 can be rotated as the cleaning nozzle is inserted into the sintered filter.

In an operation 525, the cleaning nozzle 401 is withdrawn from the sintered filter 100 in a direction 430B, in a very similar manner as the cleaning nozzle was inserted as described above, in operation 515. It should be understood that the sintered filter 100 and/or the cleaning nozzle 401 may also be rotated, as described in operation 520 above, during all or a portion of operation 525. In one implementation, the cleaning nozzle is withdrawn from the sintered filter at a rate of about 2.5 mm/s. The sintered filter 100 and/or the cleaning nozzle 401 can be rotated as the cleaning nozzle is withdrawn from the sintered filter.

It should also be understood that operations 510 through 525 can be performed in an alternating, and/or iterative and/or repetitive process, in one or more implementations. The goal of the repeating operations 510 through 525 iteratively is to ensure that every part of the filter element is directly stricken by the cleaning fluid at least once during operations 510 through 525 and to provide sufficient time for the cleaning fluid to dislodge the contaminants and sufficiently flush the dislodged contaminants out for the sintered filter 100. In one implementation, operations 510 through 525 include cleaning the sintered filter 100 with about 2.5 liters of cleaning fluid. However, it should be understood that the quantity of cleaning fluid needed to sufficiently clean a given sintered filter corresponds to the effectiveness of the cleaning fluid that removing the particles from the sintered filter and how many particles are present in the sintered filter before the cleaning process begins. A more precise measurement of the amount of cleaning fluid required for the cleaning process can be derived from testing the results to identify when flowing additional quantities of the cleaning fluid through the sintered filter yields little to no additional particles removed from the sintered filter. In one implementation, operations 510 through 525 are performed only one time.

In one implementation, operations 510 through 525 include cleaning the sintered filter 100 for about 40 seconds. It should be understood greater or lesser quantities of cleaning fluid and greater or lesser quantities of cleaning time can also be used. By way of example, a greater quantity of cleaning fluid at a lower pressure or for a longer time may provide substantially similar cleaning results as a lesser quantity of cleaning fluid at a higher pressure in a shorter time.

In an optional operation 530, the sintered filter 100 is flushed with a suitable flushing fluid as an additional flushing process to remove any dislodged particles and other contaminants not removed in the preceding operations. In one implementation the sintered filter is flushed with additional cleaning fluid. In another implementation a flushing fluid other than the cleaning fluid could be used to flush the sintered filter. Sintered filter 100 is flushed at pressure of more than about 45 bar. Flushing the sintered filter 100 includes flushing fluid through the filter inlet 104 and out the filter outlet 106 of the filter and also flushing fluid through the outlet and out the inlet.

In another optional operation 535, the cleaning fluid and flushing fluid are removed from the sintered filter 100. Removing the cleaning fluid and flushing fluid from the sintered filter can include a gas purge process such as purging with a dry gas such as a dry nitrogen or a dry argon. In one implementation, the gas purge can include applying the purge gas to the filter inlet 104 and allowing the purge gas to exit through the filter outlet 106. Alternatively or additionally, the gas purge can include applying the purge gas to the filter outlet and allowing the purge gas to exit through the filter inlet. The purging process can take between about 1 second and about 10 minutes at a flow rate of between about 100 milliliters per second and about 5 liters per second and a pressure of between about 2 bar and about 50 bar. The cleaning fluid and flushing fluid removal operation can also or alternatively include exposing the sintered filter 100 to a vacuum with a total pressure of about 100 millitorr. The cleaning fluid and flushing fluid removal operation removes any dissolved liquids from the sintered filter 100 so as to minimize oxidation of the filter surfaces such as the services of the sintered filter element 110. And the method operations can end. In one implementation, a selected, fixed volume of purging fluid is pressurized to about 25 bar and then released through the sintered filter as the pressure of the selected, fixed volume decreases to ambient atmospheric pressure over selected purge time interval of between about 1 and about 10 seconds. The selected, fixed volume can be between about 0.5 liters and about 10 liters. In one implementation, the selected, fixed volume of purging fluid is about 0.5 liter. In one implementation, the selected purge time interval is less than about 5 seconds.

Figure 6D:
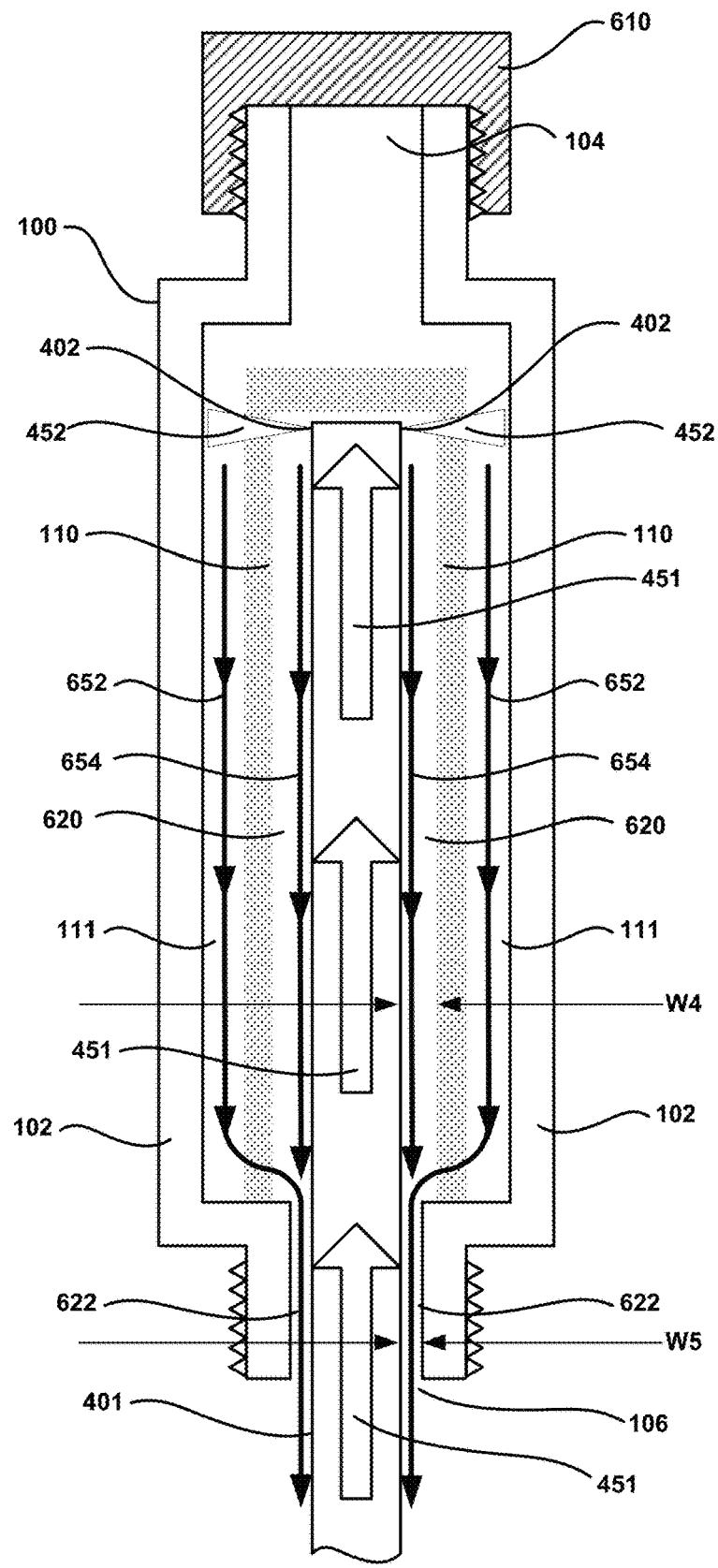

FIGS. 6A through 6D illustrates simplified schematic diagrams of the cleaning nozzle 401 performing a cleaning operation on the sintered filter 100, for lamenting embodiments of the present disclosure. Referring first to FIG. 6A, shows the cleaning nozzle 401 fully inserted into the inner volume of the sintered filter 100 as it was inserted in direction 430A. In the implementation shown, the needle is substantially fixed and the sintered filter is attached to a holder 610 that can move the sintered filter in directions 430A and 430B. The holder 610, can also rotate the sintered filter in directions 410A and 410B, relative to the cleaning nozzle 401. It should also be noted that the holder 610 substantially closes the filter inlet 104 end of the sintered filter 100. As described above, the cleaning nozzle 401 injects the cleaning fluid into the sintered filter.

Referring now to FIG. 6B, illustrates the cleaning nozzle 401 being withdrawn from the sintered filter 100. It should be understood that the cleaning nozzle 401 may not be fully withdrawn from the sintered filter in some instances. The cleaning nozzle is injecting the cleaning fluid into the sintered filter as the cleaning nozzle is withdrawn from the sintered filter. In one implementation, the cleaning nozzle ceases injection of the cleaning fluid into the sintered filter before the cleaning nozzle is fully withdrawn from the sintered filter. By way of example, the cleaning nozzle can cease injection of the cleaning fluid into the sintered filter as the outlet ports 402 are substantially aligned with the outlet end of the sintered filter element 110 such the position shown in FIG. 6B. As discussed above, the sintered filter 100 can be rotated relative to the cleaning nozzle as the cleaning nozzle is inserted and/or withdrawn from the sintered filter.

Referring now to FIG. 6C, again shows the cleaning nozzle 401 fully inserted into the sintered filter 100. In one implementation, the cleaning fluid ceases to be injected into the sintered filter when the cleaning nozzle is fully inserted into the sintered filter.

Turning now to FIG. 6D, which shows the flow of the cleaning fluid as it is injected into the sintered filter 100 by the cleaning nozzle 401 when the cleaning nozzle is fully inserted into the sintered filter. The cleaning fluid 451 flows through the inner portion of the cleaning nozzle to the outlet ports 402. The outlet ports 402 emit the cleaning fluid at the required jet velocity into the fan shaped spray 452. The fan shaped spray 452 spreads the cleaning fluid over the inner surfaces of the sintered filter element 110.

At least a first portion of the cleaning fluid 652 in the fan shaped spray 452 can pass fully through the sintered filter element 110 and impinge on the inner walls of the filter housing 102 in a space 111 between the inner walls of the filter housing and the outer surface of the sintered filter element. The first portion of the cleaning fluid 652 will pass down the length of the sintered filter element toward the filter outlet 106 end of the sintered filter 100. The first portion of the cleaning fluid 652 will then flow back through the sintered filter element and out the filter outlet 106 end of the sintered filter 100 through space 622 between the cleaning nozzle and the filter outlet end of the sintered filter. The first portion of the cleaning fluid 652 will dislodge loose and loosely attached particles in the non-linear porous structure of the sintered filter element 110 and force the dislodged particles into the space 111 between the inner walls of the filter housing and the outer surface of the sintered filter element.

A second portion of the cleaning fluid 654 in the fan shaped spray 452 will contact the surface of the sintered filter element 110 and will pass down the length of the sintered filter element in the space 620, defined as being between the cleaning nozzle 401 and the inner surface of the sintered filter element. The second portion of the cleaning fluid 654 will flow toward the filter outlet 106 end of the sintered filter 100 and out the filter outlet end of the sintered filter through space 622 between the cleaning nozzle and the filter outlet end of the sintered filter. The space 620 has a width W4 and the space 622 has a width W5 sufficient to allow the flow of the cleaning fluid to flow freely down the length of the cleaning nozzle 401 and out of the sintered filter 100. In one implementation at least one of the sintered filter 100 and/or the cleaning nozzle 401 are moved and/or rotated relative to each other using a stepper motor or similar movement device capable of providing precise movements of the sintered filter at and/or the cleaning nozzle. In one implementation the difference between the width W1 of the cleaning nozzle 401 and inner diameter D1 of the sintered filter element 110 is between about 300 um and about 1.0 mm so as to prevent contact between the cleaning nozzle and the sintered filter element and allow sufficient draining of the cleaning fluid.

Figure 6E:
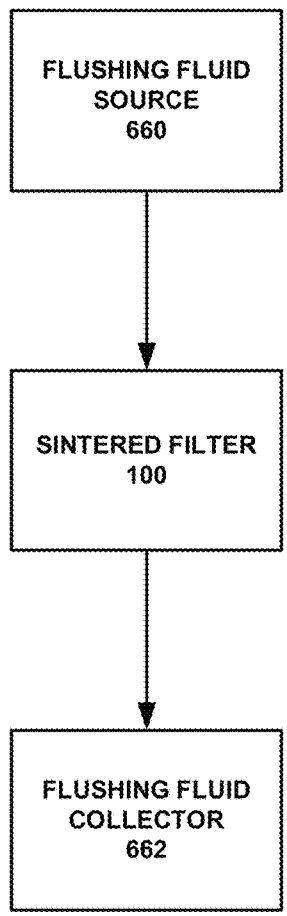
FIG. 6E is a simplified schematic of flushing the sintered filter, as described above in operation, for implementing embodiments the present disclosure.

FIG. 6E is a simplified schematic of flushing the sintered filter 100, as described above in operation 530, for implementing embodiments the present disclosure. A flushing fluid source 660 is coupled to the filter inlet and/or the filter outlet of the sintered filter 100 and a flushing fluid collector 662 is coupled to opposite end of the sintered filter. The flushing fluid can be flushed through the sintered filter one or more times in each direction.

Figure 6F:
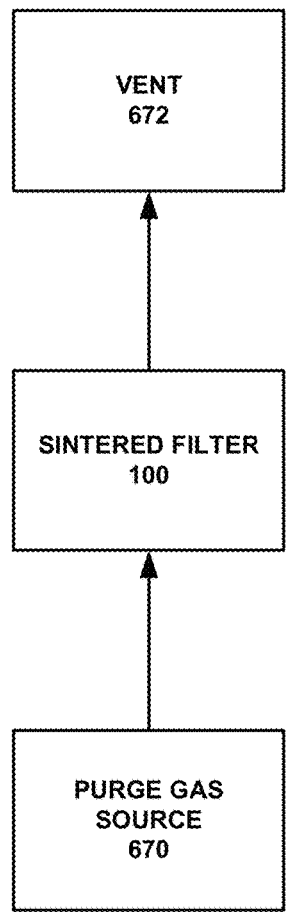
FIG. 6F is a simplified schematic of purging the sintered filter, as described above in operation, for implement embodiments of the present disclosure.

FIG. 6F is a simplified schematic of purging the sintered filter 100, as described above in operation 535, for implement embodiments of the present disclosure. The inlet or the outlet of the sintered filter is coupled to a purge gas source 670 and the opposite port is coupled to a vent 672. It should be understood that the sintered filter could be alternating only purged in both directions.

Figure 6G:
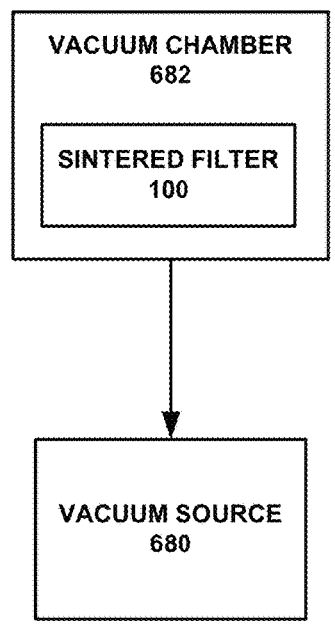
FIG. 6G is a simplified schematic for applying a vacuum to the sintered filter, as described above in operation, for implementing embodiments the present disclosure.

FIG. 6G is a simplified schematic for applying a vacuum to the sintered filter 100, as described above in operation 535, for implementing embodiments the present disclosure. The sintered filter is placed in a vacuum chamber 682 and a vacuum source 680 is used to draw vacuum on the vacuum chamber.

Figure 7:
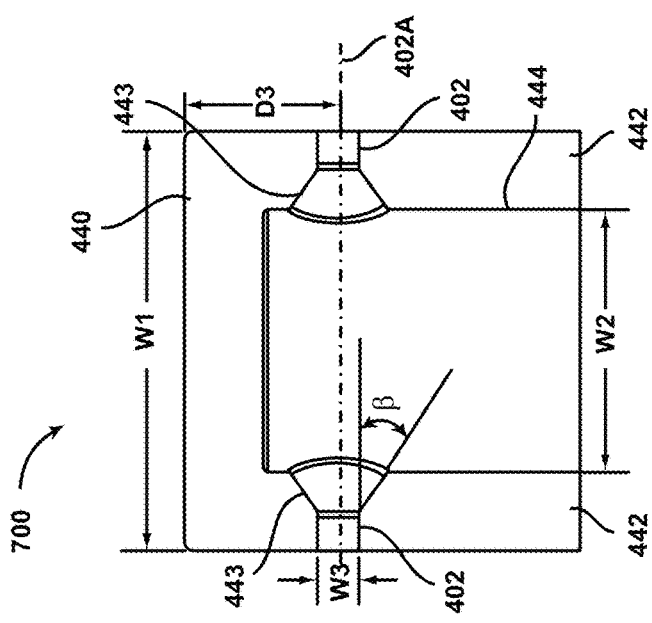
FIG. 7 is a detailed view of an end portion of an example cleaning nozzle, for implementing embodiments the present disclosure.

FIG. 7 is a detailed view of an end 700 portion of an example cleaning nozzle 401, for implementing embodiments the present disclosure. In one implementation the cleaning nozzle has the external width W1 of about 4.25 mm. However, it should be understood that an acceptable external width W1 can be any width less than an internal width of the sintered filter to be cleaned and allowing sufficient clearance in the space 622 at the outlet of the sintered filter to be cleaned to allow the cleaning fluid to escape from the sintered filter during the cleaning process. The external width W1 of the cleaning nozzle 401 should minimize the width W4 of space 620 between cleaning nozzle and the surface of the sintered filter element 110 so as to minimize the travel distance of the fan shaped spray 452 striking the surface of the sintered filter element while also providing substantially unrestricted flow for the cleaning fluid from the filter to be cleaned.

In one example implementation the cleaning nozzle 401 has an internal width W2 of about 2.65 mm. The internal width W2 of the cleaning nozzle is determined by the required strength and durability of the material used to form the cleaning nozzle and the pressure applied by the cleaning fluid to the cleaning nozzle during the cleaning process. The internal width W2 of the cleaning nozzle is ideally as large as possible so as to minimize the pressure drop from the cleaning fluid supply 450 caused by the internal width of the cleaning nozzle.

The cleaning nozzle 401 is shown with two outlet ports 402. It should be understood that the cleaning nozzle 401 can include two or more than two outlet ports 402. In one implementation, the outlet ports 402 disposed in opposite sides 442 of the cleaning nozzle 401 and also aligned opposite each other, along an outlet port centerline 402A. Having outlet ports 402 aligned along the centerline 402A and on opposite sides 442 of the cleaning nozzle 401 helps minimize the possibility of a recoil or deflection of the cleaning nozzle into the surface of the sintered filter element 110 as contact between the cleaning nozzle and the sintered filter element can result in damage to the sintered filter element and can result in a transfer of material from the cleaning nozzle to the surface of the sintered filter element. The transferred material can become dislodged and contaminate fluids passing through the sintered filter element 110. In another implementation, the outlet ports 402 can be offset around a perimeter and/or a nozzle length L of the cleaning nozzle 401.

As shown, the outlet ports 402 are offset from the outlet end 440 of the cleaning nozzle 401 a distance D3 of about 1.6 mm. It should be understood that the outlet ports can be offset different distances from the end of the cleaning nozzle such that the outlet ports can be evenly or unevenly distributed along the nozzle length L of the cleaning nozzle.

The outlet ports 402 are shown formed in the sides 442 of the cleaning nozzle 401, it should also be understood that one or more of the outlet ports can be formed in the outlet end 440 of the cleaning nozzle.

The outlet ports have a substantially round opening with an opening diameter W3 of about 0.40 mm. The outlet ports 402 also have an internal chamfer 443 having a chamfer angle β, of between about 20 and about 45 degrees from the centerline 402A of the outlet ports. However, it should be understood that this is just an exemplary implementation of the outlet ports 402 and smaller and lesser diameters of the outlet ports and different configurations of the chamfer 443 or no chamfer at all can also be utilized depending upon the pressure of the cleaning fluid and the desired shape of the fan shaped spray 452 emitted by the outlet ports.

Figure 8:
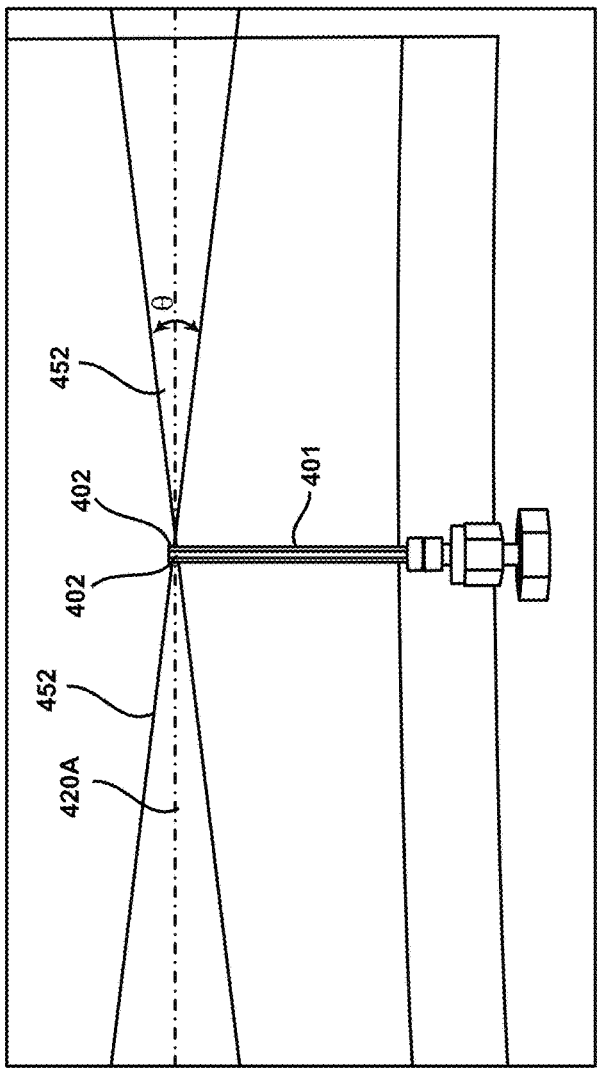
FIG. 8 is an image of a cleaning fluid flowing through the example cleaning nozzle, for implementing embodiments the present disclosure.

FIG. 8 is an image of a cleaning fluid flowing through the example cleaning nozzle 401, for implementing embodiments the present disclosure. The cleaning nozzle 401 includes two outlet ports 402 and the cleaning fluid is spraying from the outlet ports and a substantially fan shaped spray 452 having a divergence angle θ of between about 5 degrees and about 20 degrees from the centerline 402A of the outlet ports. In one implementation, a divergence angle θ is about 13 degrees from the centerline 402A of the outlet ports.

It should be noted in the preceding description that the cleaning process described was implemented by inserting the cleaning nozzle 401 into a filter outlet 106 of the sintered filter 100 to be cleaned. However in other implementations of sintered filters, the cleaning nozzle 401 may be inserted in a filter inlet 104 of the sintered filter 100 to be cleaned. In yet other implementations, both ends of the sintered filter may be accessible and the cleaning process include more than one cleaning nozzle whereas one cleaning nozzle is inserted from the inlet and the other is inserted from the outlet of the sintered filter to be cleaned. It should also be noted that as described above one end of the sintered filter to be cleaned is closed during the cleaning process, specifically the filter inlet 104 end, as described above, however it should be understood that the cleaning process could be undertaken with the filter outlet 106 end, of the sintered filter to be cleaned being closed or in yet other alternative implementations where neither the filter inlet nor the filter outlet ends of the sintered filter are closed off during the cleaning process.

Figure 9:
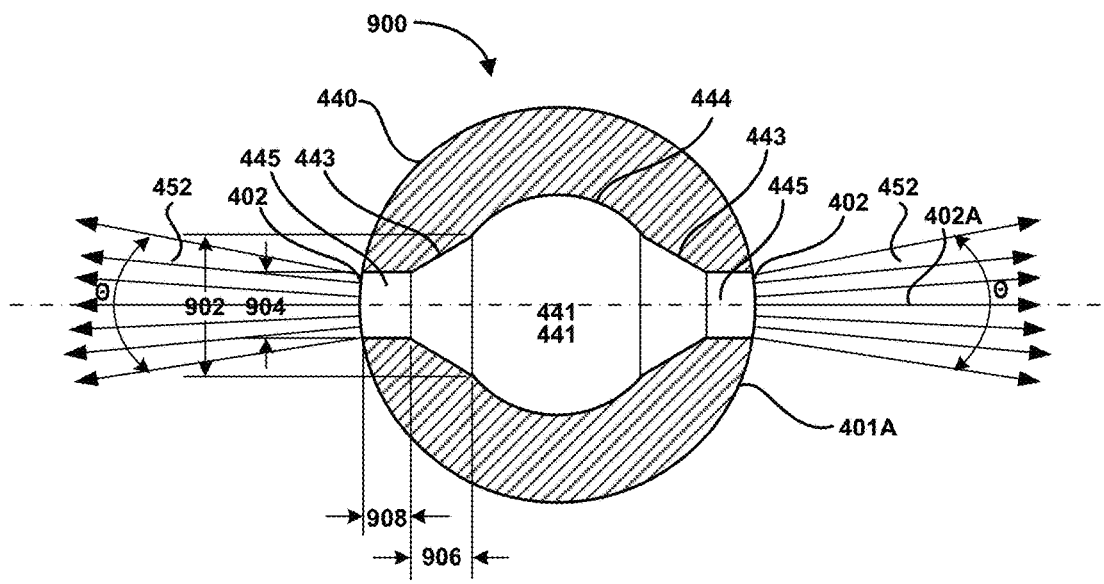
FIG. 9 is a simplified schematic diagram of an end view of an outlet end of a cleaning nozzle, for implementing embodiments of the present disclosure.

FIG. 9 is a simplified schematic diagram of an end view 900 of an outlet end 440 of a cleaning nozzle 401, for implementing embodiments of the present disclosure. The end view 900 of the outlet end 440 shows the outlet ports 402 aligned along the outlet port centerline 402A. The outlet ports 402 are opposite one another so that any force exerted by the cleaning fluid being emitted out of each of the outlet ports will be offset by the other outlet port thus preventing the cleaning fluid from pushing the cleaning nozzle into the inner surface of the sintered filter element being cleaned.

The chamfer 443 has a chamfer inner diameter 902 beginning at the inner surface 444 of the cleaning nozzle 401. The chamfer 443 also has a chamfer outer diameter 904 and a chamfer depth 906. The outlet port 402 includes an extension portion 445 having an extension length 908. The extension portion 445 extends between the chamfer 443 outer diameter and the external surface 401A of the cleaning nozzle 401. The chamfer depth 906 extends between the inner surface 444 of the cleaning nozzle 401 and the beginning of the extension portion 445. The chamfer outer diameter 904 is the same as the diameter of the extension portion 445. The extension portion has a substantially constant diameter along the extension length 908.

Figure 10:
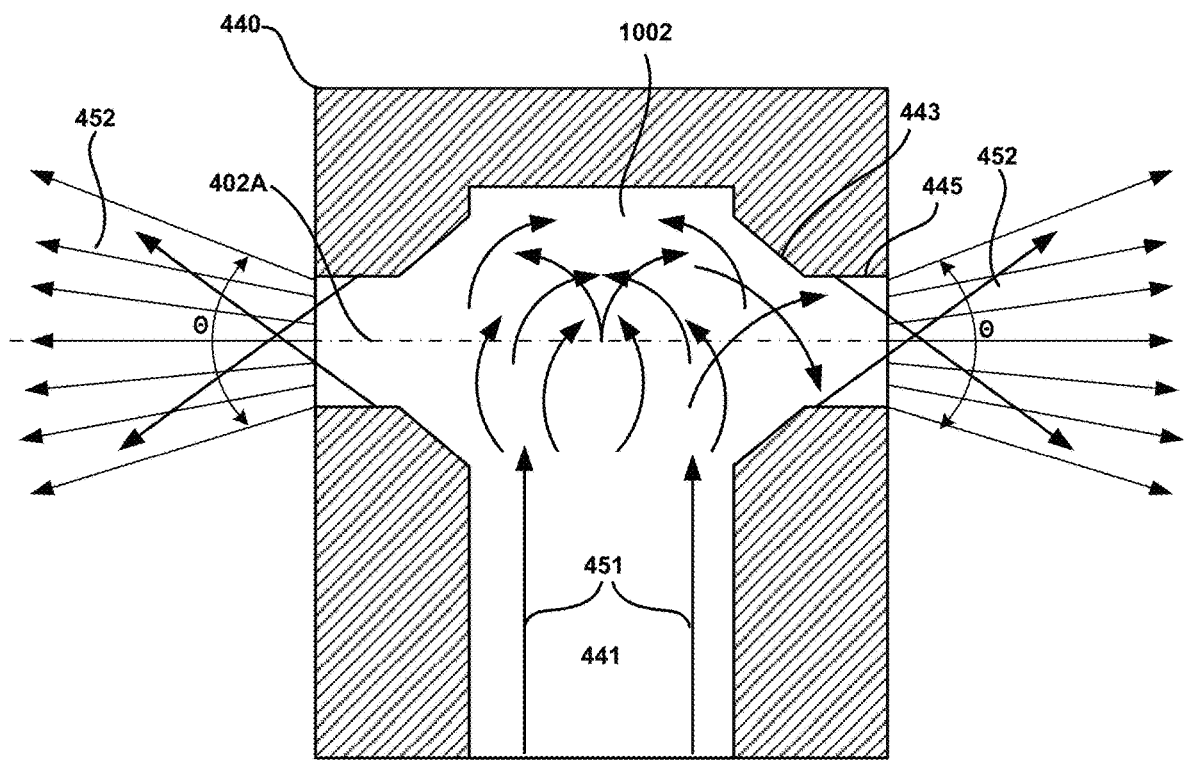
FIG. 10 is a simplified schematic diagram of a side view of an outlet end of a cleaning nozzle, for implementing embodiments of the present disclosure.

FIG. 10 is a simplified schematic diagram of a side view of an outlet end 440 of a cleaning nozzle 401, for implementing embodiments of the present disclosure. The cleaning fluid 451 flows through the hollow portion 441 of the cleaning nozzle 401 to the outlet in 440. At the outlet in the flow of the cleaning fluid becomes turbulent in a turbulent area 1002. The cleaning fluid flows from the turbulent area 1002 and out the outlet ports 402, deflecting off of the chamfer 443 and the extension portion 445 to form the fan shaped 452 cleaning fluid near the outer surface of the cleaning nozzle for one at the outlet ports 402.

Figure 11A:
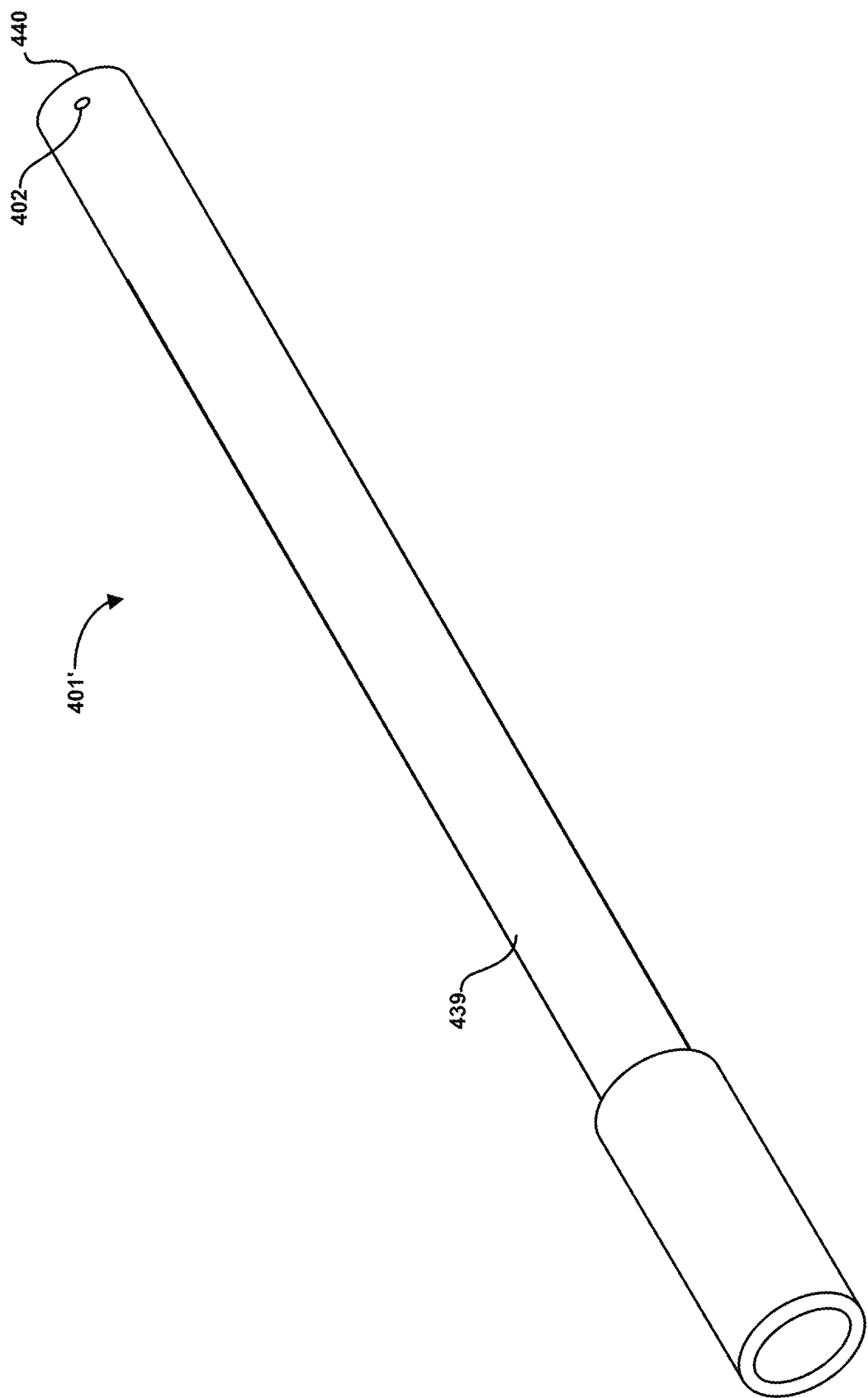
FIGS. 11A-11E include multiple views of a cleaning nozzle, for implementing embodiments the present disclosure.
Figure 11B:
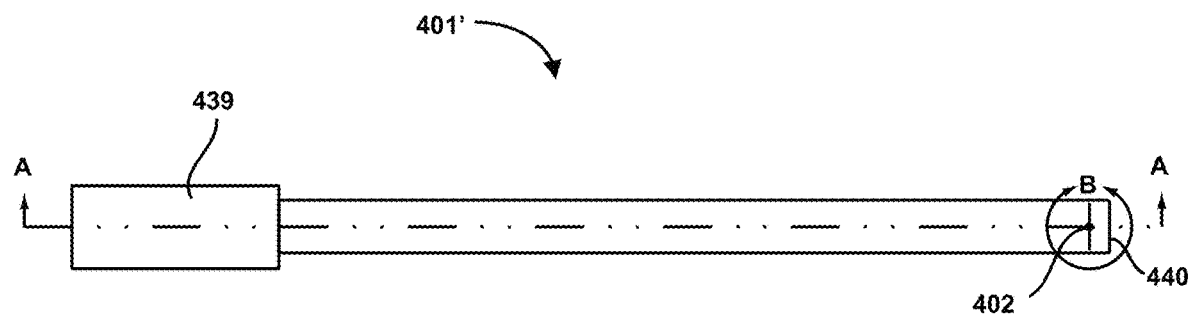

FIGS. 11A-11E include multiple views of a cleaning nozzle 401', for implementing embodiments the present disclosure. It should be noted that exemplary dimensions of this implementation of a cleaning nozzle 401' are provided for discussion purposes however other dimensions could also be utilized. FIG. 11A is an asymmetrical view of one implementation of the cleaning nozzle 401'. FIG. 11B is a side view of the cleaning nozzle 401'. The cleaning nozzle 401' includes an inlet end 439 and an outlet in 440 and the one or more outlet ports 402.

Figure 11C:
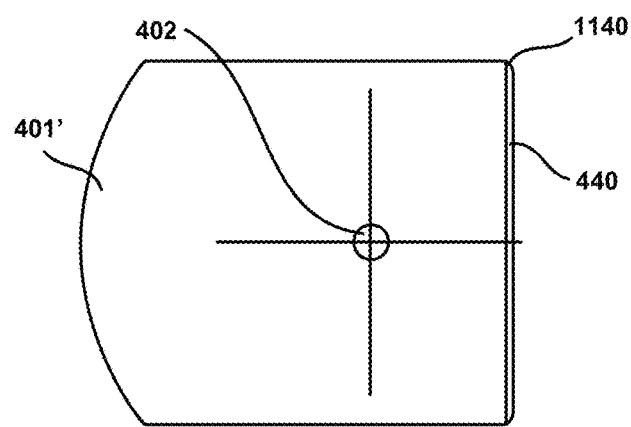

FIG. 11C is a detailed view B of the outlet end 440 of the cleaning nozzle 401' of FIG. 11B above. The detailed view B shows the outlet port 402 having a diameter in this implementation of about 0.40 mm. The detailed view B also illustrates an optional radius 1140 around the outlet end 440 of the cleaning nozzle 401'. The optional radius 1140 of about 0.25 mm to round or smooth the edge between the outlet and 440 and the sides of the cleaning nozzle 401'.

Figure 11D:
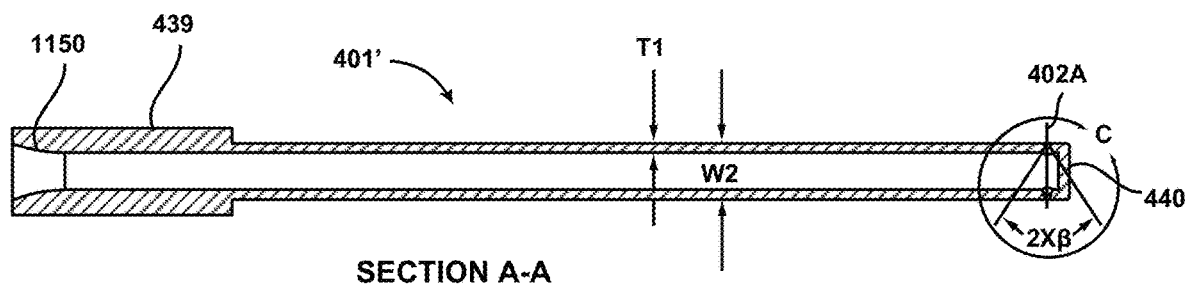

FIG. 11D is a sectional view A-A of the cleaning nozzle 401' of FIG. 11B above. The inlet end 439 includes a radius transition 1150 having a radius of about 10 mm in this implementation. The cleaning nozzle 401' has a side wall thickness T1 of between about 0.4 mm and about 1.2 mm. In one implementation, the side wall thickness T1 is about 0.8 mm. The cleaning nozzle 401' has an internal width W2 of between about 0.8 mm less than the external width W1 and about 2.4 mm less than the external width W1. In one implementation, the cleaning nozzle 401' has a chamfer angle β, of about 33 degrees from the outlet port centerline 402A, however, it should be understood that the chamfer angle β can be any suitable angle between about 0 degrees (no chamfer) and about 45 degrees from the outlet port centerline 402A.

Figure 11E:
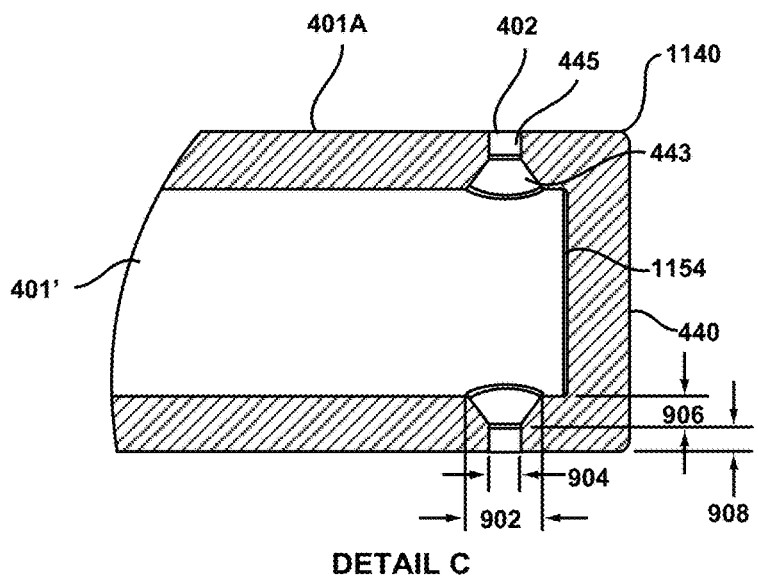

FIG. 11E is a detailed view C of the outlet end 440 of the cleaning nozzle 401' from FIG. 11D. As described in previous figures, the outlet ports 402 include the extension portion 445 having an extension length 908 of between about 0.2 mm and about 0.6 mm. The extension portion 445 extends between the chamfer 443 outer diameter and the external surface 401A of the cleaning nozzle 401. In one implementation, the extension length 908 is about 0.4 mm. The outlet end 440 also includes an optional inner radius 1154 having a radius of about 0.05 mm.

The chamfer depth 906 of between about 0.2 mm and about 0.8 mm extends between the inner surface 444 of the cleaning nozzle 401 and the beginning of the extension portion 445. In one implementation, the chamfer depth 906 is about 0.4 mm. The chamfer outer diameter 904 is the same as the diameter of the extension portion 445, e.g., 0.40 mm. The extension portion has a substantially constant diameter along the extension length 908. The chamfer 443 as an inner diameter 902 of between equal to the chamfer outer diameter 904, e.g., for an implementation with no chamfer) and about 1.6 mm larger than the chamfer outer diameter 904. It should be noted that the foregoing dimensions for the various elements of the cleaning nozzle are exemplary dimensions for a nozzle formed from stainless steel and with external dimensions sized to correspond to a specific sintered filter. If the cleaning nozzle were formed of a material other than stainless steel or sized to correspond to a different sintered filter, then the dimensions of the cleaning nozzle such as the internal width W2, the wall thickness T1, the external width W1, the nozzle length L, the chamfer depth 906, the chamfer inner diameter 902, and the extension length 908 can also vary correspondingly.

Figure 12A:
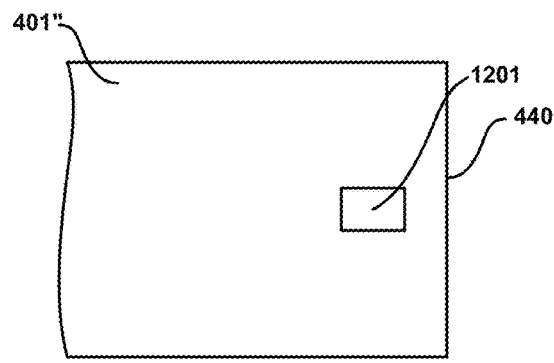
FIGS. 12A-12F include multiple side views of a cleaning nozzle having one or more non-round shaped outlet ports, for implementing embodiments the present disclosure.
Figure 12B:
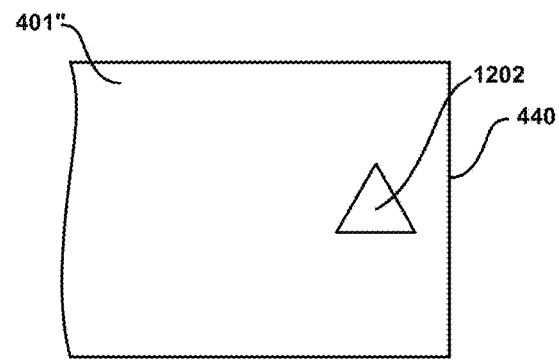
Figure 12C:
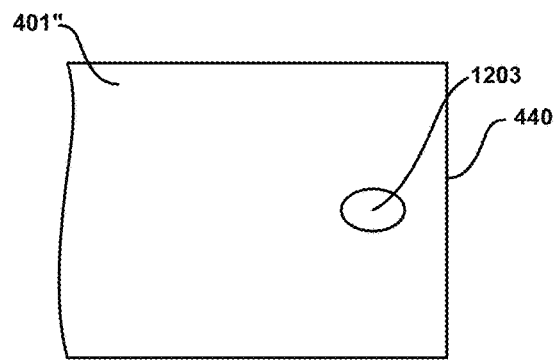
Figure 12D:
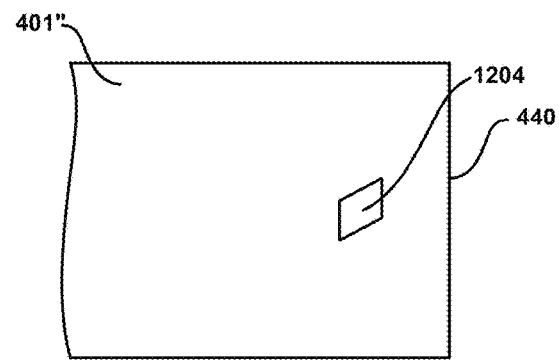
Figure 12E:
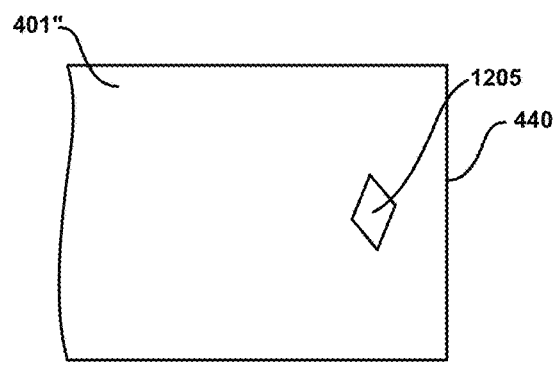
Figure 12F:
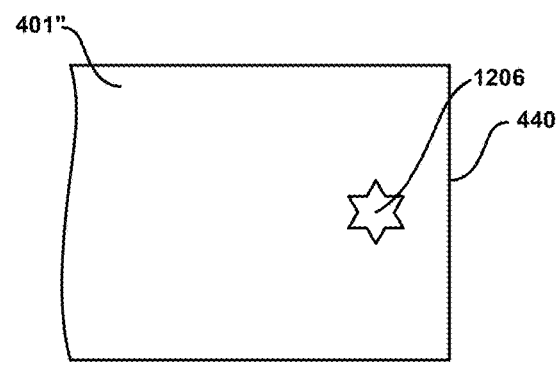

In the preceding disclosed embodiments the cleaning nozzle 401 included one or more substantially round outlet ports 402. It should be understood that the cleaning nozzle 401 can include other shapes of outlet ports 402. FIGS. 12A-12F include multiple side views of a cleaning nozzle 401" having one or more non-round shaped outlet ports, for implementing embodiments the present disclosure. Turning first to FIG. 12A which shows a cleaning nozzle 401" with one or more rectangular shaped outlet ports 1201. FIG. 12B shows a cleaning nozzle 401" with one or more triangular shaped outlet ports 1202. FIG. 12C shows a cleaning nozzle 401" with one or more oval shaped outlet ports 1203. FIG. 12D shows a cleaning nozzle 401" with one or more trapezoidal shaped outlet ports 1204. FIG. 12E shows a cleaning nozzle 401" with one or more diamond shaped outlet ports 1205. FIG. 12F shows a cleaning nozzle 401" with one or more star shaped outlet ports 1206. The foregoing FIGS. 12A-12F show various examples of different, non-round shapes of outlet ports however it should be understood that the present disclosure is not limited to only those few outlet ports shaped, as illustrated. Further, it should be understood that any suitable shaped outlet port can be used.

Figure 13:
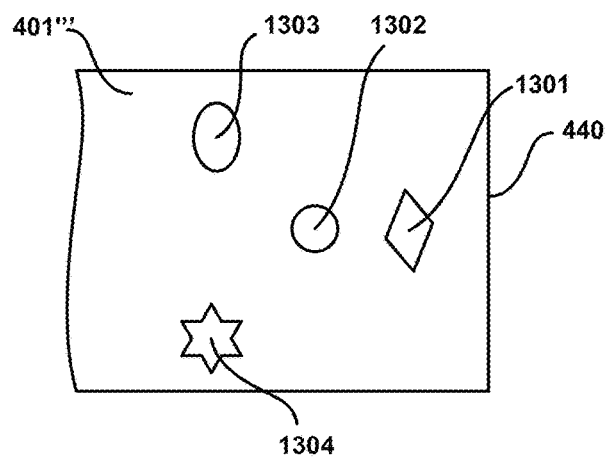
FIG. 13 is a side view of a cleaning nozzle having multiple outlet ports, for implementing embodiments the present disclosure.

FIG. 13 is a side view of a cleaning nozzle 401''' having multiple outlet ports 1301-1304, for implementing embodiments the present disclosure. The cleaning nozzle 401''' includes multiple outlet ports 1301-1304 that are distributed around the side of the cleaning nozzle. The multiple outlet ports 1301-1304 that are distributed evenly and unevenly around the side of the cleaning nozzle. By way of example, a first outlet port 1301 is substantially centered in the side of the cleaning nozzle 401''' and a second outlet port 1302 is substantially aligned with the first outlet port however spaced approximately twice a distance from the outlet end 440 as the first outlet port. Third outlet port 1303 and fourth outlet port 1304 are each substantially evenly offset from the outlet end 440 however the third and fourth outlet ports are offset from the outlet end a greater distance than either of the first and second outlet ports. It should also be noted that the outlet ports 1301-1304 have varying shapes. Specifically, first outlet port 1301 is diamond shaped, second outlet port 1302 is substantially round, third outlet port 1303 is elliptical more oval shaped and fourth outlet port 1304 is star shaped.

Figure 14A:
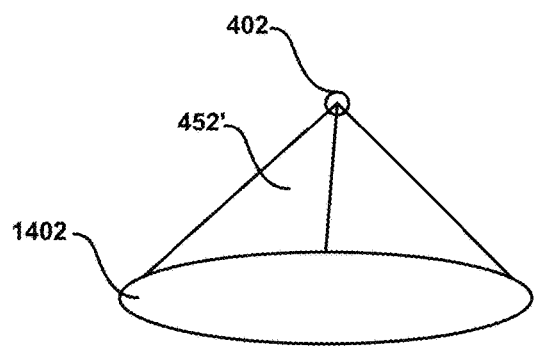
FIGS. 14A-14C are pictorial views of multiple fan shaped sprays, for implementing embodiments the present disclosure.
Figure 14B:
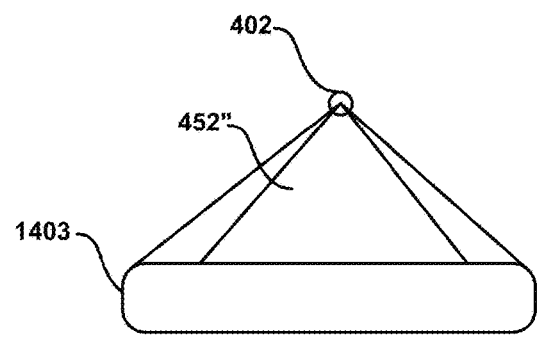
Figure 14C:
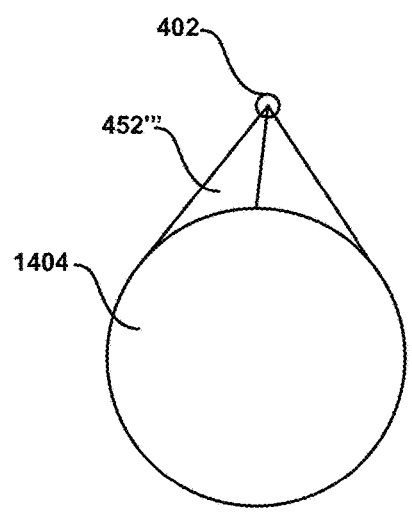

Just as the outlet ports can have different shapes it should also be understood that the fan shaped spray 452 can have different shapes as well. FIGS. 14A-14C are pictorial views of multiple fan shaped sprays 452', 452", 452''', for implementing embodiments the present disclosure. FIG. 14A shows a substantially oval or elliptical fan shaped spray 452' that has a substantially oval or elliptical cross sectional shape 1402. The cross-sectional shape reflects the contact pattern that the elliptical cross-sectional shape 1402 that the fan shaped spray would contact any surface being sprayed, such as the surface of the centered filter element 110 shown in preceding figures above.

FIG. 14B, shows a substantially rectangular fan shaped spray 452" that has a substantially rectangular cross sectional shape 1403. It should be understood that substantially rectangular cross sectional shape 1403 is shown elongated to exaggerate the rectangular shape however it should be understood that the rectangular cross-sectional shape can be substantially square as well.

FIG. 14C, shows a substantially round fan shaped spray 452''' that has a substantially round cross sectional shape 1404. The foregoing FIGS. 14A-14C show various examples of different cross-sectional shapes of the fan shaped sprays 452, 452', 452", 452''', however it should be understood that the present disclosure is not limited to only those cross sectional fan shapes as illustrated. Further, it should be understood that any suitable cross sectional fan shapes can be used.

Figure 15A:
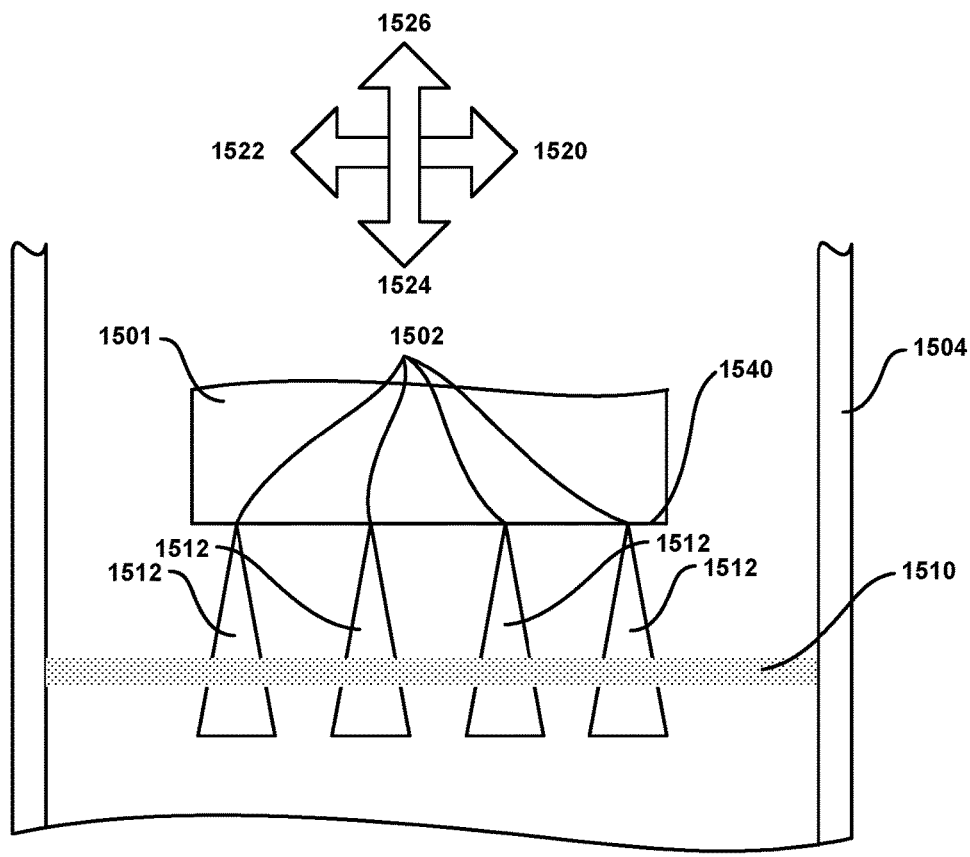
FIG. 15A is a side view of a cleaning nozzle having multiple outlet ports for projecting multiple cleaning fluid sprays from an outlet end for cleaning a substantially flat sintered filter element, for implementing embodiments the present disclosure.

The foregoing disclosure has been described in some detail with regard to the specific shape of a sintered filter 100 and the sintered filter element 110 contained therein, however the disclosed configuration of the sintered filter and the sintered filter element are merely exemplary configurations and many other configurations of sintered filters and sintered filter elements could also be used with similar cleaning processes using similar but different shaped cleaning nozzles. FIG. 15A is a side view of a cleaning nozzle 1501 having multiple outlet ports 1502 for projecting multiple cleaning fluid sprays 1502 from an outlet end 1540 for cleaning a substantially flat sintered filter element 1510, for implementing embodiments the present disclosure. The cleaning nozzle 1501 includes multiple outlet ports 1502 disposed in the outlet end 1540 of the cleaning nozzle. The cleaning nozzle 1501 is intended for cleaning a substantially flat sintered filter element 1510 that is housed in a sintered filter housing 1504.

The cleaning nozzle 1501 is capable of being moved closer or further from the substantially flat, sintered filter element 1510, in directions 1526 and 1524, as may be necessary to direct and focus the fan shaped sprays 1512 on the various portions of the substantially flat, sintered filter element. Similarly, the cleaning nozzle 1501 is capable of being moved side to side relative to the substantially flat, sintered filter element 1510, in directions 1520 and 1522, as may be necessary, to direct and focus the fan shaped sprays 1512 on the various portions of the substantially flat, sintered filter element. It should also be understood that the cleaning nozzle 1501 and/or the sintered filter housing 1504 can be rotated relative to each other, as may be necessary, to direct and focus the fan shaped sprays 1512 on the various portions of the substantially flat, sintered filter element.

Figure 15B:
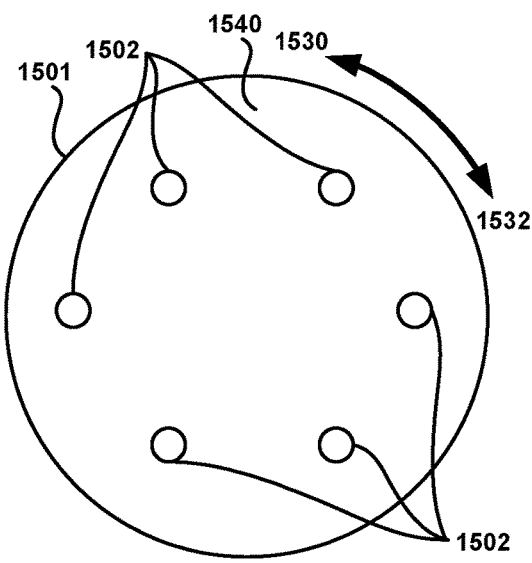
FIGS. 15B and 15C are outlet end views of the cleaning nozzle having multiple outlet ports disposed in an outlet end, for implementing embodiments the present disclosure.
Figure 15C:
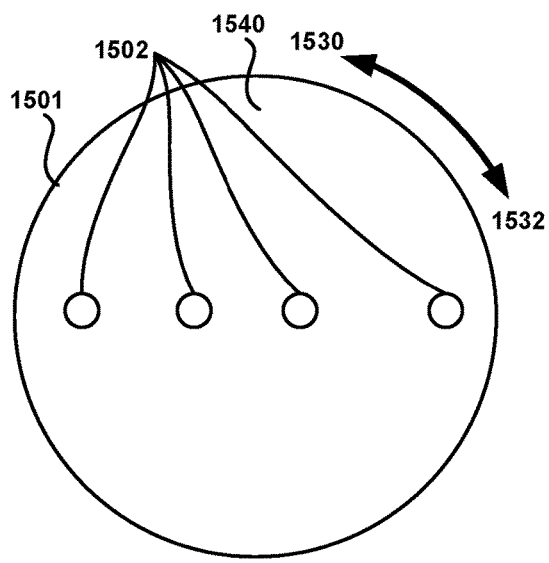

FIGS. 15B and 15C are outlet end views of the cleaning nozzle 1501 having multiple outlet ports 1502 disposed in an outlet end 1540, for implementing embodiments the present disclosure. The multiple outlet ports 1502 are distributed around the outlet end 1540 of the cleaning nozzle. As shown in FIG. 15B, the multiple outlet ports 1502 are substantially evenly distributed around surface of the outlet end 1540 and substantially evenly placed from the perimeter of the outlet end. As shown in FIG. 15C, the multiple outlet ports 1502 illustrated is substantially aligned in one line across the surface of the outlet end 1540. It should be noted that the outlet ports 1502 are shown in FIG. 15C, as being unevenly spaced. Should also be noted that as shown in FIGS. 15B and 15C, the cleaning nozzle 1501 and/or the substantially flat sintered filter element housing 1504 can be rotated in directions 1530 and 1532 relative to one another to direct and focus the fan shaped sprays 1512 on the various portions of the substantially flat, sintered filter element.

Figure 16A:
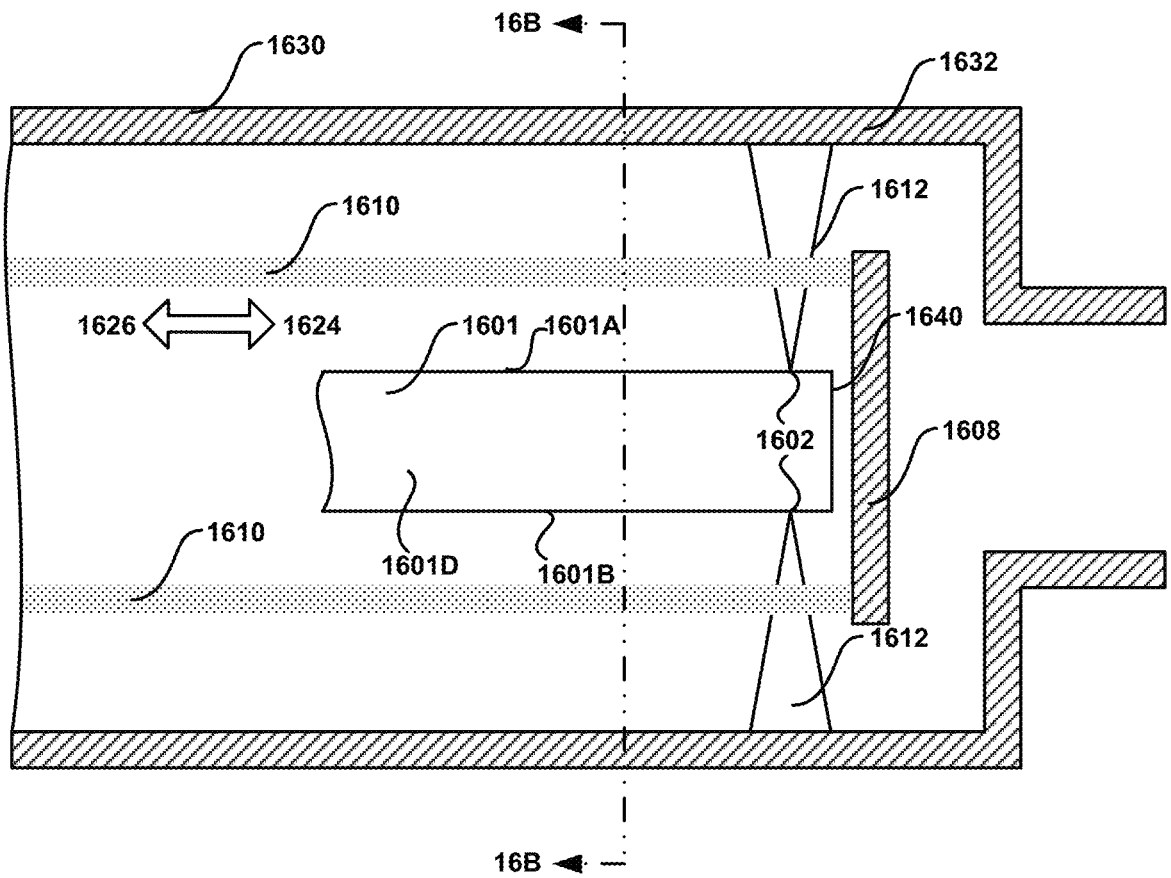
FIG. 16A is a cross sectional side view of a cleaning nozzle, for implementing embodiments of the present disclosure.
Figure 16B:
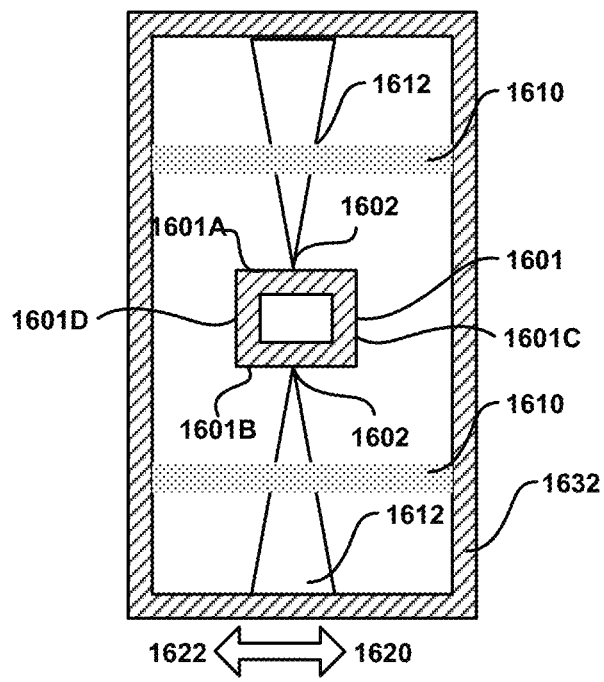
FIG. 16B is a cross-sectional in view of the cleaning nozzle, for implementing embodiments of the present disclosure.

FIG. 16A is a cross sectional side view of a cleaning nozzle 1601, for implementing embodiments of the present disclosure. FIG. 16B is a cross-sectional in view 16B-16B of the cleaning nozzle 1601, for implementing embodiments of the present disclosure. The cleaning nozzle 1601 is intended to clean the substantially flat sintered filter element 1610 included in a filter 1630. The filter 1630 includes filter housing 1632 and a flow diverter 1608.

The cleaning nozzle 1601 includes multiple, substantially flat sides 1601A-1601D. Substantially flat side 1601A and side 1601B have outlet holes 1602 for emitting cleaning fluid in fan shaped sprays 1612. The substantially flat sides 1601A, 1601B correspond to substantially flat sintered filter elements 1610. The cleaning nozzle 1601 can be moved in directions 1624 and 1626 and directions 1620 and 1622 to move the fan shaped spray 1612 so that the cleaning fluid strikes all surfaces of the substantially flat sintered filter element 1610. It should be noted that while only two outlet ports 1602 are shown in FIGS. 16A and 16B, more than two outlet ports can be included in the cleaning nozzle 1601. By way of example additional cleaning ports can be included in substantially flat sides 1601C and 1601D. Alternatively or additionally, additional cleaning ports can be included in substantially flat sides 1601A and 1601B.

The foregoing figures show various examples of different shapes of sintered filters, sintered filter elements, filter housings and different shaped cleaning nozzles however it should be understood that the present disclosure is not limited to only those example shapes of sintered filters, sintered filter elements, filter housings and cleaning nozzles. Further, it should be understood that any suitable cross sectional fan shapes can be used.

Although the foregoing disclosure has been described in some detail for purposes of clarity of understanding, it will be apparent that certain changes and modifications may be practiced within the scope of the appended claims. Accordingly, the present embodiments are to be considered as illustrative and not restrictive, and the disclosure is not to be limited to the details given herein, but may be modified within the scope and equivalents of the appended claims.

What is claimed is:

1. A system comprising:
 a sintered filter having a housing having an inner wall and a sintered filter element comprising bound metal particles defining non-linear pore paths between the bound metal particles, the sintered filter element being disposed within the housing in such a way as to define spaces between the inner wall of the housing and the sintered filter element through which a fluid being filtered flows through the housing, the housing having an inlet and an outlet, the sintered filter element having an open end and a closed end, the open end of the sintered filter element located at the outlet of the housing;
 a cleaning fluid source; and
 a cleaning nozzle having an inlet end coupled to the cleaning fluid source and at least two outlet ports for outputting cleaning fluid injected through the cleaning nozzle, the cleaning nozzle being inserted into the sintered filter such that the cleaning nozzle extends through the outlet of the housing and the open end of the sintered filter element and into an inner volume defined by the sintered filter element, and the cleaning nozzle having an external width that is less than an internal width of the outlet of the housing such that a space through which cleaning fluid can flow is defined between an outer surface of the cleaning nozzle and the inner surface of the outlet of the housing.

2. The system of claim 1, wherein the at least two outlet ports of the cleaning nozzle are disposed in a side of the cleaning nozzle and disposed proximate to an outlet end of the cleaning nozzle.

3. The system of claim 1, wherein the cleaning nozzle has two outlet ports disposed proximate to an outlet end of the cleaning nozzle, and the outlet ports are defined in opposite sides of the cleaning nozzle.

4. The system of claim 3, wherein the two outlet ports are substantially aligned along a centerline that extends through the cleaning nozzle.

5. The system of claim 1, wherein each of the outlet ports has a chamfer and an extension portion for outputting the cleaning fluid in a fan shaped spray having a divergence angle of between about 5 degrees and about 20 degrees.

6. The system of claim 5, wherein the chamfer is formed on an inner surface of the cleaning nozzle.

7. The system of claim 1, wherein the at least two outlet ports have substantially round openings.

8. The system of claim 1, wherein the at least two outlet ports have substantially non-round openings.

9. The system of claim 5, wherein the chamfer has a chamfer angle of between about 20 degrees and about 45 degrees.

10. The system of claim 5, wherein the divergence angle is between about 8 degrees and about 13 degrees.

11. The system of claim 1, wherein a difference between the external width of the cleaning nozzle and the internal width of the outlet of the housing of the sintered filter is between about 300 µm and 1.0 mm.

12. The system of claim 4, wherein the two outlet ports aligned along the centerline that extends through the cleaning nozzle are offset from an outlet end of the cleaning nozzle by a distance of about 1.6 mm.

13. The system of claim 7, wherein an opening diameter of the at least two outlet ports having substantially round openings is about 0.40 mm.

14. The system of claim 1, wherein the cleaning nozzle has an external width of about 4.25 mm.

15. The system of claim 14, wherein the cleaning nozzle has an internal width of about 2.65 mm.

16. A system comprising:
 a sintered filter having a housing having an inner wall and a sintered filter element comprising bound metal particles defining non-linear pore paths between the bound metal particles, the sintered filter element being disposed within the housing in such a way as to define spaces between the inner wall of the housing and the sintered filter element through which a fluid being filtered flows through the housing, the housing having an inlet and an outlet, the sintered filter element having an open end and a closed end, the open end of the sintered filter element located at the outlet of the housing;
 a cleaning fluid source;
 a cleaning nozzle having an inlet end coupled to the cleaning fluid source and at least two outlet ports for outputting cleaning fluid injected through the cleaning nozzle, the cleaning nozzle being inserted into the sintered filter such that the cleaning nozzle extends through the outlet of the housing and the open end of the sintered filter element and into an inner volume defined by the sintered filter element, and the cleaning nozzle having an external width that is less than an internal width of the outlet of the housing such that a space
 through which cleaning fluid can flow is defined between an outer surface of the cleaning nozzle and the inner surface of the outlet of the housing; and a holder for supporting the sintered filter, the holder being attached to the sintered filter at the inlet of the housing.

17. The system of claim 16, wherein holder is configured to move the sintered filter in an axial direction relative to the cleaning nozzle.

18. The system of claim 16, wherein the holder is configured to rotate the sintered filter relative to the cleaning nozzle.

19. The system of claim 16, wherein the holder attached to the sintered filter substantially closes off the inlet of the housing of the sintered filter.

20. The system of claim 1 wherein the voids form non-linear pore paths.

21. The system of claim 1 wherein the sintered filter element has a non-linear porous, large surface area structure.

22. The system of claim 16 wherein the voids form non-linear pore paths.

23. The system of claim 16 wherein the sintered filter element has a non-linear porous, large surface area structure.

* * * * *